(12) United States Patent
Beeckman et al.

(10) Patent No.: US 9,604,203 B2
(45) Date of Patent: Mar. 28, 2017

(54) REFORMING CATALYST COMPOSITIONS (75) Inventors: Jean W. Beeckman, Columbia, MD (US); Stephen J. McCarthy, Center Valley, PA (US); Jane C. Cheng, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1385 days.

(21) Appl. No.: 13/235,858

(22) Filed: Sep. 19, 2011

(65) Prior Publication Data

US 2013/0068663 A1    Mar. 21, 2013

(51) Int. Cl.
| | |
|---|---|
| *B01J 29/06* | (2006.01) |
| *B01J 29/12* | (2006.01) |
| *B01J 37/10* | (2006.01) |
| *C10G 35/06* | (2006.01) |
| *C10G 35/085* | (2006.01) |
| *C10G 35/09* | (2006.01) |
| *B01J 37/00* | (2006.01) |

(52) U.S. Cl.
CPC .............. *B01J 29/126* (2013.01); *B01J 37/10* (2013.01); *C10G 35/065* (2013.01); *C10G 35/085* (2013.01); *C10G 35/09* (2013.01); *B01J 37/0009* (2013.01); *B01J 2229/16* (2013.01); *B01J 2229/20* (2013.01); *B01J 2229/36* (2013.01); *B01J 2229/42* (2013.01)

(58) Field of Classification Search
USPC .................................. 502/64, 66, 75, 79, 86
See application file for complete search history.

(56) References Cited

U.S. PATENT DOCUMENTS

| | | | |
|---|---|---|---|
| 3,354,078 A | | 11/1967 | Miale et al. |
| 4,832,824 A | | 5/1989 | Vaughan et al. |
| RE33,323 E | | 9/1990 | Roarty et al. |
| 5,108,969 A | * | 4/1992 | Del Rossi et al. ............. 502/66 |
| 5,185,484 A | | 2/1993 | Del Rossi et al. |
| 5,700,942 A | | 12/1997 | McAteer et al. |
| 5,939,044 A | | 8/1999 | Nakagawa et al. |
| 5,965,104 A | | 10/1999 | Lee et al. |
| 6,033,643 A | | 3/2000 | Yuen et al. |
| 6,156,290 A | | 12/2000 | Lee et al. |
| 7,407,907 B2 | * | 8/2008 | Galperin et al. ............... 502/64 |
| 2005/0101474 A1 | * | 5/2005 | Galperin et al. ............... 502/64 |

FOREIGN PATENT DOCUMENTS

WO        8904860 A1    6/1989

OTHER PUBLICATIONS

International Search Report issued Dec. 21, 2012 in corresponding PCT Application No. PCT/US2012/055896, 3 pp.
Written Opinion issued Dec. 21, 2012 in corresponding PCT Application No. PCT/US2012/055896, 3 pp.

* cited by examiner

*Primary Examiner* — Elizabeth Wood
(74) *Attorney, Agent, or Firm* — Glenn T. Barrett; Andrew T. Ward (57) ABSTRACT

Process for the preparation of a catalyst suitable for use in a naphtha reforming process, the process including providing a Y zeolite with an initial $SiO_2:Al_2O_3$ molar ratio of at least 150, introducing the Y zeolite to a binder to form an intermediate composition, extruding the intermediate composition, reducing the alpha acidity of the extruded composition to provide a low acid composition, and introducing a noble metal to the low acid composition. Processes and systems of converting naphtha to a higher-octane hydrocarbon supply using catalysts, as prepared herein, are also disclosed.

16 Claims, 5 Drawing Sheets

REFORMING CATALYST COMPOSITIONS

FIELD

The presently disclosed subject matter relates to catalyst compositions that are chlorine free and more stable. These catalyst compositions permit longer cycles with less regeneration cycles and reduce maintenance costs from downstream corrosion associated with standard chlorine containing catalysts. The catalyst compositions in accordance with the presently disclosed subject matter can increase the octane rating of a naphtha feed, which in turn can be blended with, for example gasoline to provide a high-octane gasoline and other fuel products. Furthermore, the catalyst compositions in accordance with the presently disclosed subject matter can increase gasoline yield at the same octane level or increase octane level at the same yield.

BACKGROUND

Catalytic reforming of naphtha is widely used in the petroleum refining industry to increase the octane of naphtha for gasoline blending. Important reactions that occur in catalytic reforming include 1) the dehydrogenation of naphthenes to aromatics, 2) isomerization of paraffins to isoparaffins, and 3) the dehydrocyclization of paraffins to aromatics.

Undesirable reactions include the hydrocracking of paraffins and naphthenes and the dealkylation of aromatics that results in the loss of liquid and hydrogen yields and the production of lower-valued fuel gas. A more selective reforming catalyst could significantly increase reforming margins by increasing liquid and hydrogen yields via reduced hydrocracking and increased paraffin dehydrocyclization activity.

Dual functional reforming catalysts have been commercialized. Early reforming catalysts consisted of platinum metal supported on an acidic, chlorided alumina. Chlorine is typically added to the reforming catalyst to maintain the acidity. The chlorine needs to be replenished and presents operating issues. Chlorine is corrosive to the unit and highly reactive. Their key limitation was coke stability. Bimetallic reforming catalysts (PtRe/Al$_2$O$_3$) have been introduced with improved stability and provided equivalent activity and selectivity to earlier catalysts. PtIr/Al$_2$O$_3$ catalysts have also been commercialized that are higher activity but less selective than Pt and PtRe catalysts. Other reforming catalyst, such as PtSn, seek to provide higher stability for improved operation at lower pressure. However, there remains a need for reforming catalyst with improved selectivity and/or that provide an increase in gasoline yield.

SUMMARY

One aspect of the presently disclosed subject matter provides a process for the preparation of a catalyst suitable for use in a naphtha reforming process. The process includes providing a Y zeolite with an initial SiO$_2$:Al$_2$O$_3$ molar ratio of at least 150, introducing the Y zeolite to a binder to form an intermediate composition, extruding the intermediate composition, reducing the acidity of the extruded composition to provide a low acid an acidity-reduced composition, and introducing a noble metal to the low acid composition. The low acid composition has a reduced number of Bronsted acid sites compared to a similar composition without reduced acidity. The catalyst prepared according to the presently disclosed process is improved because it is chlorine free, which provides numerous advantages. The catalyst is more stable. The catalyst is capable of operating (i) with longer cycle times at the same temperature and pressure resulting in less down time normally associated with catalyst regeneration or (ii) at higher temperatures and/or higher pressures with the same cycle time. Operating at higher temperatures results in a product with higher octane. Operating at higher pressures results in improved product yield.

The chlorine free catalyst produced in accordance with the presently disclosed subject matter provides additional benefits to the processing units. The presence of chlorine creates various operating issues, which require regular shutdowns for cleaning and repair. The use of the chlorine free catalyst reduces the corrosive environment with the processing unit, which reduces corrosion issues. The catalyst is less sensitive to water, which makes it better suited for use in facilities in humid environments. A further benefit is the reduction in coke production when compared to the use of a chlorine containing catalyst. The coke formation is greatly reduced (i.e., coke level is an order of magnitude lower).

Another aspect of the presently disclosed subject matter provides a process for converting naphtha to a higher-octane hydrocarbon supply. The process includes providing a source of naphtha, and exposing the naphtha to a catalyst to convert the naphtha to a higher-octane hydrocarbon supply. The catalyst can be any one of the catalyst compositions of the presently disclosed subject matter. In one embodiment, the catalyst is prepared by a process that includes providing a Y zeolite with an initial SiO$_2$:Al$_2$O$_3$ molar ratio of at least 150, introducing the Y zeolite to a binder to form an intermediate composition, extruding the intermediate composition, reducing the acidity of the extruded composition to provide a low acid composition, and introducing a noble metal to the low acid composition.

Yet another aspect of the presently disclosed subject matter provides a system for converting naphtha to either (i) a higher-octane hydrocarbon supply at the same yield or (ii) a higher supply of hydrocarbon at the same octane. The system includes a source of naphtha, at least one vessel having an inlet to receive at least a portion of the naphtha and an outlet to discharge a stream of converted naphtha and a catalyst housed in the vessel to convert the naphtha to a higher octane hydrocarbon. The catalyst can be any one of the catalyst compositions of the presently disclosed subject matter. In one embodiment, the catalyst is prepared by a process that includes providing a Y zeolite with an initial SiO$_2$:Al$_2$O$_3$ molar ratio of at least 150, introducing the Y zeolite to a binder to form an intermediate composition, extruding the intermediate composition, reducing the acidity of the extruded composition to provide a low acid composition, and introducing a noble metal to the low acid composition.

These and other features of the presently disclosed subject matter will become apparent from the following detailed description of embodiments which, taken in conjunction with the accompanying drawings, illustrate by way of example the principles of the present application.

BRIEF DESCRIPTION OF THE DRAWINGS

The disclosed subject matter will now be described in conjunction with the accompanying drawings in which.

DETAILED DESCRIPTION

Definitions

The term "alpha acidity" is known to those of ordinary skill in the art. As used herein, "alpha acidity" is defined as described in U.S. Pat. No. 3,354,078, in the *Journal of Catalysis*, Vol. 6, pp. 522-529 (August 1965) and in the *Journal of Catalysis*, Vol 61, p. 395 (1980), each incorporated herein by reference. The alpha acidity is an approximate indication of the catalytic cracking activity of the catalyst compared to a standard catalyst and it gives the relative rate constant (rate of normal hexane conversion per volume of catalyst per unit time). Generally, alpha acidity is based on the activity a highly-active silica-alumina zeolite cracking catalyst taken as an alpha of 1 (Rate constant=0.016 $sec^{-1}$).

As used herein, the term "produced in an industrial scale" refers to a production scheme in which, for example, gasoline or other end product is produced on a continuous basis (with the exception of necessary outages for plant maintenance) over an extended period of time (e.g., over at least a week, or a month, or a year) with the expectation of generating revenues from the sale or distribution of the end product. Production at an industrial scale is distinguished from laboratory or pilot plant settings which are typically maintained only for the limited period of the experiment or investigation, and are conducted for research purposes and not with the expectation of generating revenue from the sale or distribution of the end product produced thereby. In one embodiment, the catalysts of the present application are used to produce high-octane gasoline in an industrial scale.

Reference will now be made to various aspects of the present application in view of the definitions above.

In accordance with an initial aspect of the presently disclosed subject matter, a process is provided for the preparation of a catalyst suitable for use in a naphtha reforming process. The process includes providing a Y zeolite with an initial $SiO_2$:$Al_2O_3$ molar ratio of at least 150, introducing the Y zeolite to a binder to form an intermediate composition, extruding the intermediate composition, reducing the alpha acidity of the extruded composition to provide an acidity-reduced composition, and introducing a noble metal to the acidity-reduced composition.

For purpose of illustration and not limitation, the initial $SiO_2$:$Al_2O_3$ molar ratio can be at least 175 or higher, for example, at least 200, or at least 225 or at least 250, or at least 255. The surface area of the Y zeolite can be at least 600 $m^2/g$, or alternatively at least 700 $m^2/g$, or still alternatively at least 750 $m^2/g$. The Y zeolite is typically in the H-form.

The binder can include $SiO_2$, such as, for example, commercially available $SiO_2$ binders from Ultrasil Corporation and commercially available silica resin binders from Dow Corning. The $SiO_2$ binder can be added to the intermediate composition in an amount such the intermediate composition has a solid weight ratio of Y zeolite:binder of from about 7:3 to about 9:1 (e.g., 8:2) prior to being extruded, based on the total solid weight of the intermediate composition at 1000° F.

The extruded composition can be treated in one or more operations (e.g., a series of operations) that further reduce alumina induced acidity of the composition. After the performing the one or more operations to provide an acidity-reduced composition, the alpha acidity of the composition can be, for example, less than 1.25, or less than 1.0, or less than 0.75, less than 0.5, less than 0.4, less than 0.3, or less than 0.2. Common techniques can be used to reduce the number of acid sites including, but not limited to streaming. These one or more operations can also impart and favor the formation of highly specific acid sites that help establish the high selectivity towards aromatics.

For example, the extrude composition can be calcined, such as, for example, a calcining operation in which the calcining occurs at a heat up rate of from about 3° F. to about 7° F. per minute. The extruded composition can be maintained, for example, at least about 1000° F. for at least 2 hours.

Alternatively, or in addition, the intermediate composition can be subjected to an ammonium exchange operation. According to one non-limiting embodiment, the pH of the extruded composition at beginning of the ammonium exchange operation can be from about 5.7 to about 5.0, and/or the pH of the extruded composition at the end of the ammonium exchange operation can be from about 4.5 to about 3.8. The ammonium exchange operation can include introducing a $NH_4^+$ source to a vessel (e.g., an exchange burette) that contains the extruded composition to mix the $NH_4^+$ source with the extruded composition.

Alternatively, or in addition, the intermediate composition can be subjected to a steaming operation. According to one non-limiting embodiment, the steaming operation includes heating the extruded composition to at least 1400° F. at a rate of from about 3° F. to about 7° F. per minute and subsequently introducing steam to the heated composition.

Upon obtaining the low acid composition, a noble metal can be introduced. In one embodiment, the noble metal is selected from platinum, rhenium, iridium and combinations thereof. Furthermore, it is contemplated that any metal used for reforming catalysts are suitable. The noble metal can be introduced, for example, by a procedure in which the catalyst composition is introduced to an impregnation cone and rotated, and the noble metal is added to the rotating cone. According to a non-limiting embodiment, the noble metal can be added in an amount such that the final catalyst composition, prior to any additional drying or calcining operations, contains up to about 0.5 wt %, or up to about 0.7 wt %, or up to about 0.9 wt %, based on the total weight of the composition. Upon adding the noble metal, the composition can be subjected to a drying and/or calcining procedure. The resulting catalyst is substantially chlorine free.

Yet another aspect of the presently disclosed subject matter provides a process for converting naphtha to a higher-octane hydrocarbon supply. The process includes providing a source of naphtha, and exposing the naphtha to a catalyst to convert the naphtha to a higher-octane hydrocarbon supply. The catalyst is prepared by a process that includes providing a Y zeolite with an initial $SiO_2$:$Al_2O_3$ molar ratio of at least 150, introducing the Y zeolite to a binder to form an intermediate composition, extruding the intermediate composition, reducing the acidity of the extruded composition to provide a low acid composition, and introducing a noble metal to the low acid composition.

The higher-octane hydrocarbon supply can be blended with, for example, gasoline to provide high-octane gasoline.

Yet another aspect of the presently disclosed subject matter provides a system for converting naphtha to a higher-octane hydrocarbon supply. The system includes a source of naphtha, at least one vessel having an inlet to receive at least a portion of the naphtha and an outlet to discharge a stream of converted naphtha and a catalyst housed in the vessel to convert the naphtha to a higher octane hydrocarbon. The catalyst can be any one of the catalyst compositions of the presently disclosed subject matter. The catalyst is prepared by a process that includes providing a Y zeolite with an initial $SiO_2:Al_2O_3$ molar ratio of at least 150, introducing the Y zeolite to a binder to form an intermediate composition, extruding the intermediate composition, reducing the acidity of the extruded composition to provide a low acid composition, and introducing a noble metal to the low acid composition.

Figure 1:
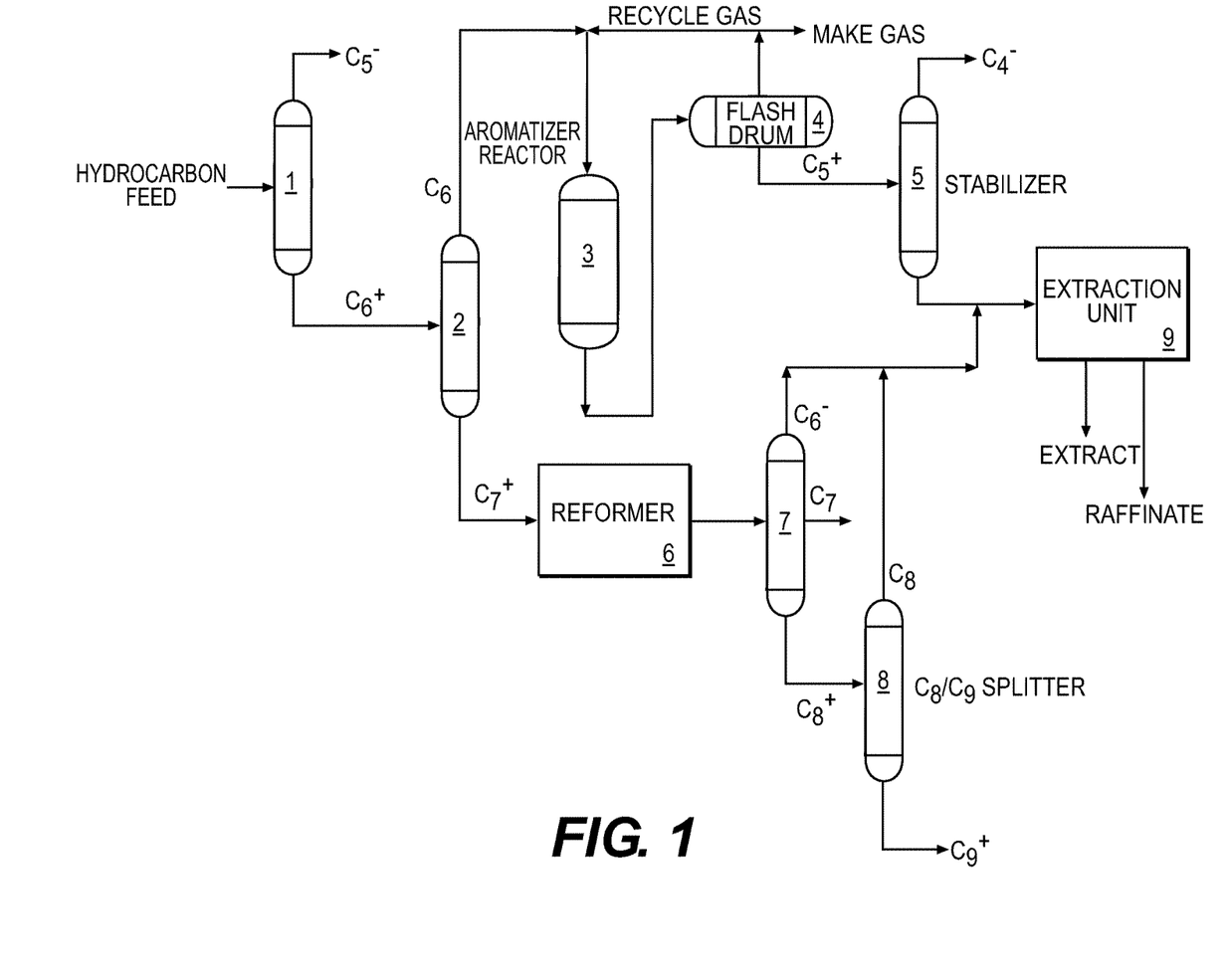
FIG. 1 depicts a schematic of an exemplary catalytic reforming process disclosed in U.S. Reissue Pat. No. 33,323.

As noted above, the presently disclosed catalyst compositions are suitable for use in any naphtha reforming process. An exemplary, non-limiting reforming process is depicted in FIG. 1, also disclosed in Reissue Pat. No. 33,323 which is hereby incorporated by reference in its entirety. It is also contemplated that the presently disclosed catalyst compositions are suitable for use in the formation of aromatics with lower cetane numbers.

As disclosed in Re. 33,323, a full boiling range naphtha feedstream, comprising a range of hydrocarbons from $C_3$ to those boiling up to about 350° F. and containing paraffins, naphthenes and aromatics is fed into distillation tower 1 to separate a $C_{5-}$ fraction from a $C_{6+}$ fraction. The resultant $C_{6+}$ fraction contains $C_5$ hydrocarbons, $C_{10+}$ hydrocarbons, $C_6$ hydrocarbons and $C_7$ to $C_9$ hydrocarbons, while the $C_{5-}$ fraction contains $C_6$ hydrocarbons and $C_{5-}$ hydrocarbons.

The $C_{6+}$ fraction from distillation tower 1 is then fed into distillation tower 2 to separate a $C_6$ fraction from a $C_{7+}$ fraction. The resultant $C_6$ fraction contains $C_5$ hydrocarbons, $C_6$ hydrocarbons and $C_{7+}$ hydrocarbons, with the $C_{7+}$ fraction containing $C_6$ hydrocarbons, $C_7$ to $C_9$ hydrocarbons and $C_{10+}$ hydrocarbons.

The $C_6$ fraction is fed into the aromatizer reactor 3 which can contain a catalyst of the present application. The effluent from the aromatizer reactor 3 contains benzene, and toluene. The effluents are then fed into a flash drum 4 to separate a $C_{5+}$ effluent with benzene being recovered in the flash drum. The $C_{4-}$ stream containing hydrogen from the flash drum 4 is then recycled as needed to the aromatizer reactor 3 with excess used as make gas. The $C_{5+}$ effluent is then fed into a stabilizer 5 to further purify and remove any $C_{4-}$ hydrocarbons.

The $C_{7+}$ fraction is fed into a conventional reformer 6 which can also contain a catalyst of the present application. The reformer effluent contains $C_{5-}$ hydrocarbons, benzene, other $C_6$ hydrocarbons (excluding benzene), toluene, xylenes and $C_{9+}$ hydrocarbons. The reformer effluent is then fed into a toluene rejection tower 7 from which a $C_7$ effluent containing $C_7$ hydrocarbon (mostly toluene) is taken as a sidestream, a $C_{6-}$ effluent containing $C_{5-}$ hydrocarbons, benzene, other $C_6$ hydrocarbons (excluding benzene) and $C_7$ hydrocarbons is taken overhead and a $C_{8+}$ effluent containing $C_7$, and $C_8$ hydrocarbons (mostly xylenes) and $C_{9+}$ hydrocarbons (mostly aromatics) is taken from the bottom. The $C_{8+}$ effluent is then further distilled in a $C_8/C_9$ splitter tower 8 from which a $C_8$ effluent containing $C_8$ hydrocarbons and $C_{9+}$ and a $C_{9+}$ effluent containing $C_8$ hydrocarbons and mostly $C_{9+}$ hydrocarbons is recovered.

The $C_{5+}$ effluent from the aromatizer and the $C_{6-}$ effluent and $C_8$ effluent from the reformer are then mixed and fed into the extraction unit 9 which utilizes sulfolane to solvent extract aromatics with the aromatics extract stream containing benzene, toluene and $C_8$ aromatics while the non-aromatic raffinate stream contains aromatics. The non-aromatic raffinate stream is then advantageously feed back to tower 2 to produce benzene. In connection with the production of benzene, the reforming catalysts in accordance with the presently disclosed subject matter may be employed in reactor 3 and reactor 6.

Example

The present application is further described by means of the examples, presented below. The use of such examples is illustrative only and in no way limits the scope and meaning of the presently disclosed subject matter or of any exemplified term. Likewise, the disclosed subject matter is not limited to any particular preferred embodiments described herein. Indeed, many modifications and variations of the disclosed subject matter will be apparent to those skilled in the art upon reading this specification. The disclosed subject matter is to be limited only by the terms of the appended claims along with the full scope of equivalents to which the claims are entitled.

Example 1

Catalyst Support Preparation

The starting crystal was Tosoh390 HUA, obtained from Tosoh USA Inc. (Grove City, Ohio). The analysis of this crystal is shown in Table 1.

TABLE 1

| Starting Crystal Properties | | |
|---|---|---|
| $SiO_2$ | 97.52 | wt % |
| $Al_2O_3$ | 0.624 | wt % |
| Na: 0.0036 wt % | 0.0036 | wt % |
| $SiO_2:Al_2O_3$ | 266 | molar ratio |
| Solids @ 1000° F. | 98.45 | wt % |
| BET | 808 | m2/gm |
| Alpha Acidity | 1.4 | |

Extrusion

During the mulling, a mixture of 806 gm of Tosoh390 HUA, 216 gm Ultrasil $SiO_2$ binder (Hayward, Calif.), 30 of Polyvinylalcohol and 900 gm deionized water were mixed and mulled in the Eirich mixer until an extrudeable mixture was obtained. The mixture was such as to obtain a 80/20 1000° F. solids w/w ratio of USY (Tosoh390)/$SiO_2$ (Ultrasil). USY is an ultrastabilized Y zeolite. The Eirich mixer employed in this non-limiting example is a tilted rotating pan of approximately 12" in diameter and a 6" height and can be obtained from Elrich Machines Inc. (Gurnee, Ill.). Internally, this mixer has rotating blades that were kept at the high RPM setting. The mixture was transformed from initially a powder consistency to a ~1/16"-1/8" spheroids consistency. This mixture was then extruded into 1/16" cylinders using a 2" diameter Bonnot extruder (Union Town, Ohio) to form a mulmix solid. The mulmix solids at 1000° F. were 50.2 wt % (i.e., the amount of solid remaining). The crush strength of a small sample using an anvil of the extrudates after calcination at 1000° F. were measured at 15.3 lbs/inch. The extrudates were dried overnight at 250° F. in a drying oven.

Calcination

Material from the extrusion operation was then charged to a fixed bed calcining oven with air flowing upwards through the bed. The heat up rate was set at 5° F./min and the air rate was set at 10 Liter/min. When 1000° F. was reached, the composition was maintained at 1000° F. for 3 hours whereupon it was allowed to cool down to room temperature. The properties of the calcined support are given in Table 2.

TABLE 2

| Properties of calcined support | |
|---|---|
| BET | 662 m²/gm |
| Na | 1210 ppm |
| Alpha acidity | 0.1 |
| UCS (Å) | 24.29 |
| $nC_6$ Ads. Cap. | 14.9 wt % |

Ammonium Exchange 1000 cc of the calcinated sample described in Table 2 were then loaded into a exchange burette and 5 Liters of 1N $NH_4NO_3$ are pumped around in up flow through the bed for 1 hr. The pH at the start was 5.42 and the pH at the end was 3.85.

This step was repeated an additional 3 times. The start to finish pH values were 1) from 5.40 to 3.90; 2) from 5.32 to 4.25; and 3) from 5.33 to 4.35. Between each of these steps, the catalyst was washed with deionized water which results, interalia, in an increase in pH. After these exchanges, the catalyst was washed with 10 Liters deionized water and dried overnight at 250° F. Thereafter the support was calcined in air at 1000° F. for 1 hr using an initial heat up rate of 5° F./min with an air flow rate of 5 Liter/min. The product properties are shown in Table 3.

TABLE 3

| Properties of Ammonium-Exchanged Composition | |
|---|---|
| Na | 255 ppm |
| BET | 670 m2/gm |
| Alpha acidity | 0.3 |
| UCS (Å) | 24.29 |
| nC6 ads. Cap | 17.3 wt % |

Steaming 1000 cc of the ammonium-exchanged composition described in Table 3 were charged to the steamer. Nitrogen flow was established at 5 L/min and the catalyst was ramped at 5° F./min until 1500° F. was reached. At 1500° F., the flow was switched from $N_2$ to steam and held at 1500° F. in 100% steam for 1 hr. After this time, the earlier $N_2$ flow was re-established and steam was cut out and the catalyst was allowed to cool down. The product properties are shown in Table 4.

TABLE 4

| Properties of steamed support | |
|---|---|
| BET | 628 m2/gm |
| Alpha acidity | 0.5 |
| UCS (Å) | 24.29 |
| $nC_6$ ads. Cap | 13.7 wt % |
| Crush (lbs/inch) | 58.2 |

Introduction of Noble Metal

Catalyst A—0.9% Pt/Tosoh USY-1

11 gm of the steamed support described in Table 4 were charged to an impregnation cone and set to rotate at 20 RPM. The absorption capacity (AF value) was determined at 1.09 gm deionized water/gm support. 0.11 gm of Pt metal were added as 2.82 gms of a solution containing 3.904 wt % Pt and diluted with deionized water until 12 cc of impregnation volume were obtained. The Pt compound used in this non-limiting example was Pt-tetraamine-nitrate. Thereafter the pH of the solution was adjusted to 9.0. This solution was then sprayed onto the rotating support for approximately 15 minutes. When the spraying was finished, the batch was tumbled for an additional 30 min at 5 RPM. The impregnated catalyst was discharged and dried overnight at 250° F. The dried catalyst was then calcined for 1 hr at 680° F. in dry air at a flow rate of 5 vol air/vol catalyst/min and a heatup rate of 5° F./min was employed. The product properties are shown in Table 5.

TABLE 5

| Properties of catalyst 0.9% Pt/Tosoh USY-1 (Catalyst A) | |
|---|---|
| Pt | 0.93 wt % |
| BET | 621 m2/gm |
| H/Pt | 0.55 |
| UCS (Å) | 24.29 |
| $nC_6$ ads. Cap. | 15.0 wt % |

Catalyst B—0.9% Pt/Tosoh USY-2

11 gm of the steamed support described in Table 4 were charged were charged to an impregnation cone and set to rotate at 20 RPM. The absorption capacity (AF value) was determined at 1.09 gm DI water/gm support. An amount of 0.11 gm of Pt metal were added as 2.82 gms of a vendor solution containing 3.904 wt % Pt and diluted with DI water until 12 cc of impregnation volume were obtained. The Pt compound used in this non-limiting embodiment was Pt-tetraamine-nitrate. Thereafter the pH of the solution was adjusted to 8.5. This solution was then sprayed onto the rotating support in approximately 15 minutes. When the spraying was finished, the batch was tumbled for an additional 30 min at 5 RPM. The impregnated catalyst was discharged and dried overnight at 250 F. The dried catalyst was then calcined for 1 hr at 680° F. in dry air at a flow rate of 5 vol air/vol catalyst/min and a heatup rate of 5° F./min was employed. The product properties are shown in Table 6.

TABLE 6

| Properties of catalyst 0.9% Pt/Tosoh USY-2 (Catalyst B) | |
|---|---|
| Pt | 0.92 wt % |
| BET | 615 m²/gm |
| H/Pt | 0.58 |
| UCS (Å) | 24.29 |
| $nC_6$ ads. Cap. | 15.2 wt % |

Catalyst A and Catalyst B have different adjusted pHs (e.g., 8.5 v. 9.0)/

Catalyst C

Comparative Example

This alumina catalyst contained 0.9 wt % Cl and 0.09 wt % S, and is coated with 0.3% Pt/0.3% Re. Catalyst C (e.g., KX-120 catalyst) is a conventional reforming catalyst.

Catalyst D

Comparative Example

This catalyst contained 0.3 wt % Pt, 0.8 wt % Cl and 0.04 wt % S. Catalyst D is a commercially available catalyst (e.g., Criterion PHF-43 (0.3 wt % Pt on $Al_2O_3$)).

Example 2

Catalyst Testing Using a n-Heptane Feed

Test A (0.8 g Catalyst at 500° C., 350 psig, 10 WHSV, and 5:1 $H_2$/HC)

The catalyst for testing (0.800 g, sized to 14-30 mesh) was diluted to 3 cc with 40-60 mesh quartz-chips and mixed. The well-mixed mixture was loaded to the middle zone of an isothermal, down-flow, fixed-bed, ⅜" outside diameter stainless steel reactor. After pressure test at 450 psig, the reactor pressure was set at 100 psig and $H_2$ flow was set at 200 cc/min. The reactor was heated at a ramp rate of 2° C./min from 20° C. to 450° C., then at 5° C./min from 450° C. to 500° C. After 30 minutes, the reactor was cooled down to 400° C. The reactor pressure was set at 350 psig. Once reaching 350 psig, the $H_2$ flow rate was reduced to 170 cc/min, and n-heptane was introduced to the reactor at 12 cc/hr. The reactor was heated at a ramp rate of 5° C./min from 400° C. to 500° C. Fifteen minutes after the reactor reached 500° C., product analysis was conducted by an on-line GC (60M DB-1, −20° C., 2 min, 8° C./min to 250° C., hold for 30 min). The analysis continued every hour until a total of 6 GC analyses were conducted. The average data from GC2 to GC6 are reported in the data table.

Test B (0.19 g Catalyst at 500° C., 350 psig, 16-50 WHSV, and 5:1 $H_2$/HC)

The catalyst for testing (0.19 g, sized to 14-30 mesh) was diluted to 3 cc with 40-60 mesh quartz-chips. The same procedure described in Test A was followed to start the run. N-heptane and $H_2$ flow rates were set sequentially as shown below. Six GC analyses (once every hour) were conducted at each setting. The average data from GC2 to GC6 at each flow setting are reported in Table 7:

TABLE 7

| | n-Heptane Rate Flow, cc/hr | | | | |
|---|---|---|---|---|---|
| | 14.0 | 9.0 | 6.2 | 4.5 | 14 |
| $H_2$ Rate, cc/min | 198 | 127 | 88 | 66 | 198 |
| n-Heptane WHSV | 50 | 32 | 22 | 16 | 50 |

Test C (0.8 g Catalyst at 500° C., 350 psig, 4.8-12 WHSV, and 5:1 $H_2$/HC)

The catalyst for testing (0.8 g, sized to 14-30 mesh) was diluted to 3 cc with 40-60 mesh quartz-chips. The same procedure described in Test A was followed to start the run. N-heptane and $H_2$ flow rates were set sequentially as shown below. Six GC analyses (once every hour) were conducted at each setting. The average data from GC2 to GC6 at each flow setting are reported in Table 8.

TABLE 8

| | n-Heptane Flow Rate, cc/hr | | | |
|---|---|---|---|---|
| | 14.0 | 11.8 | 8.4 | 5.6 |
| $H_2$ Flow Rate, cc/min | 198 | 166 | 119 | 79. |
| n-Heptane WHSV | 12 | 10 | 7.2 | 4.8 |

Catalysts Evaluation 0.9% Pt/USY-1 (Catalyst A)

The catalyst was evaluated with Test A. Test results can be found in data table and data plots below.

0.9% Pt/USY-2 (Catalyst B)

The catalyst was evaluated with Test A and Test B. Test results can be found in data table and data plots below.

0.3% Pt/0.3% Re/Alumina (Comparison, Catalyst C)

This catalyst contained 0.9 wt % Cl and 0.09 wt % S. As discussed above, Catalyst C is a commercially available catalyst.

The catalyst was evaluated with Test A, Test B (with the first three flow settings) and Test C. Test results can be found in data table and data plots below.

Comparison of Performance of Pt/Re/Alumina and Pt/USY Catalysts

Table 9 shows test results under Test A conditions. Average data from GC2 to GC6 with stream time from 1.3 hr to 5.3 hr are used. At similar total heptane conversion ranging from 69-73%, Pt/USY catalysts (i.e., Catalysts A and B) provided 27.4-27.5% toluene selectivity vs. 17.6% with 0.3Pt/0.3Re/Alumina. (i.e., Catalyst C).

Table 10 show test results under Test B conditions (with 0.3Pt/0.3Re/Alumina catalyst (Catalyst C) using the first three flow settings). When compared under the same WHSV and comparable total heptane conversion, Pt/USY-2 catalysts (Catalyst B) provided about 10% higher selectivity for toluene than the 0.3Pt/0.3Re/Alumina catalyst (Catalyst C). For example, at 32 WHSV and 32% total heptane conversion, Pt/USY had 31% toluene selectivity where as 0.3Pt/0.3Re/Alumina had 20%).

TABLE 9

Comparison of Performance of Pt/Re/Alumina and Pt/USY Catalysts Under Test A Conditions (500° C., 350-360 psig, 10 WHSV, 5:1 $H_2$/HC, 5.5 hours on stream)

| | Catalyst | | |
|---|---|---|---|
| | 0.3Pt/0.3Re/ Alumina | 0.9Pt/ USY-1 | 0.9Pt/ USY-2 |
| Total heptane Conv, % | 68.8 | 70.6 | 73.2 |
| n-Heptane Conv, % | 92.2 | 93.4 | 94.2 |
| Toluene Sel, wt % | 17.6 | 27.5 | 27.4 |
| Toluene Yield, wt % | 12.1 | 19.4 | 20.1 |
| Yields, wt % (4 hr average) | | | |
| Methane | 2.58 | 3.46 | 3.56 |
| Ethene | 0.02 | 0.00 | 0.00 |
| Ethane | 4.43 | 3.18 | 3.26 |
| Propene | 0.06 | 0.02 | 0.02 |
| Propane | 11.76 | 10.78 | 11.36 |
| iso-Butane | 8.24 | 4.99 | 5.53 |
| n-Butane | 7.91 | 8.47 | 8.62 |
| Butenes, Butadiene | 0.14 | 0.07 | 0.07 |
| iso-Pentane | 6.56 | 2.55 | 2.64 |
| n-Pentane | 4.00 | 3.75 | 3.69 |
| neo-Pentane | 0.02 | 0.01 | 0.01 |

TABLE 9-continued

Comparison of Performance of Pt/Re/Alumina and Pt/USY Catalysts Under Test A Conditions (500° C., 350-360 psig, 10 WHSV, 5:1 H$_2$/HC, 5.5 hours on stream)

| | Catalyst | | |
|---|---|---|---|
| | 0.3Pt/0.3Re/Alumina | 0.9Pt/USY-1 | 0.9Pt/USY-2 |
| Pentenes | 0.14 | 0.06 | 0.06 |
| Hexanes | 7.92 | 9.13 | 9.16 |
| Hexenes | 0.13 | 0.12 | 0.12 |
| Cyclohexane | 0.01 | 0.04 | 0.04 |
| Methycyclopentane | 0.14 | 0.03 | 0.14 |
| 2,4-Dimethylpentane | 0.97 | 1.38 | 1.20 |
| 2-Methylhexane | 7.13 | 6.66 | 6.16 |
| 3-Methylhexane | 8.77 | 8.23 | 7.60 |
| n-Heptane | 7.71 | 6.55 | 5.75 |
| Other Heptanes (2,2-DMP, 2,2,3-TMB, 3,3-DMP, 2,3-MDP, EtP) | 6.19 | 5.91 | 5.52 |
| Heptens | 0.33 | 0.44 | 0.40 |
| Methylcycloheptane | 0.13 | 0.22 | 0.21 |
| Benzene | 0.78 | 2.40 | 2.58 |
| Toluene | 12.10 | 19.41 | 20.06 |
| C8+ Hydrocarbon | 1.81 | 2.12 | 2.23 |
| Sum | 100.0 | 100.0 | 100.0 |
| Sum of C7 Hydrocarbon | 31.24 | 29.40 | 26.85 |
| C5+ Hydrocarbon | 64.86 | 69.03 | 67.59 |
| C1-C6 Hydrocarbon | 54.85 | 49.07 | 50.86 |
| C7+ Hydrocarbon | 45.15 | 50.93 | 49.14 |
| Molar Hydrocarbon Ratio | | | |
| C1/C6 | 1.54 | 1.58 | 1.59 |
| C2/C5 | 0.99 | 1.20 | 1.22 |
| C3/C4 | 0.96 | 1.05 | 1.05 |
| i-C4/n-C4 | 1.04 | 0.59 | 0.64 |
| C1/C3 | 0.60 | 0.88 | 0.86 |

TABLE 10

Comparison of Performance of Pt/Re/Alumina and Pt/USY-2 Under Test B Conditions (500° C., 350-360 psig, 5:1 H$_2$/HC)

| | Catalyst | | | | | | | |
|---|---|---|---|---|---|---|---|---|
| | 0.3Pt/0.3Re/Alumina | | | 0.9Pt/USY-2 | | | | |
| Hours on Stream | 1.3-5.3 | 7.3-11.3 | 12.3-13.3 | 1.3-5.3 | 7.3-11.3 | 13.3-17.3 | 19.3-23.3 | 25.3-29.3 |
| n-Heptane WHSV | 50 | 32 | 22 | 50 | 32 | 22 | 16 | 50 |
| Total heptane Conv, % | 22.3 | 31.9 | 40.2 | 26.0 | 31.7 | 39.1 | 47.1 | 21.8 |
| n-Heptane Conv, % | 53.6 | 65.5 | 73.5 | 60.9 | 68.9 | 76.6 | 82.8 | 53.3 |
| Toluene Sel, wt % | 20.8 | 20.1 | 19.2 | 33.7 | 31.0 | 28.7 | 26.9 | 32.2 |
| Toluene Yield, wt % | 4.6 | 6.4 | 7.7 | 8.8 | 9.8 | 11.2 | 12.7 | 7.0 |
| Yields, wt % (4 hr average) | | | | | | | | |
| Methane | 0.81 | 1.28 | 1.69 | 0.94 | 1.14 | 1.45 | 1.82 | 0.75 |
| Ethene | 0.02 | 0.04 | 0.06 | 0.01 | 0.03 | 0.04 | 0.06 | 0.05 |
| Ethane | 1.55 | 2.28 | 2.93 | 1.14 | 1.46 | 1.88 | 2.33 | 1.07 |
| Propene | 0.05 | 0.10 | 0.14 | 0.03 | 0.07 | 0.11 | 0.16 | 0.11 |
| Propane | 3.36 | 4.78 | 6.06 | 3.31 | 4.49 | 5.99 | 7.62 | 2.85 |
| iso-Butane | 0.93 | 1.56 | 2.16 | 1.03 | 1.56 | 2.31 | 3.18 | 0.73 |
| n-Butane | 3.42 | 4.60 | 5.61 | 3.25 | 4.18 | 5.27 | 6.38 | 2.90 |
| Butenes, Butadiene | 0.08 | 0.14 | 0.21 | 0.06 | 0.10 | 0.16 | 0.23 | 0.14 |
| iso-Pentane | 1.52 | 2.42 | 3.23 | 0.54 | 0.77 | 1.09 | 1.44 | 0.40 |
| n-Pentane | 1.93 | 2.56 | 3.05 | 1.88 | 2.21 | 2.58 | 2.91 | 1.68 |
| neo-Pentane | 0.00 | 0.01 | 0.01 | 0.00 | 0.00 | 0.00 | 0.00 | 0.00 |
| Pentenes | 0.08 | 0.14 | 0.20 | 0.05 | 0.09 | 0.14 | 0.19 | 0.12 |
| Hexanes | 3.10 | 4.58 | 5.75 | 3.50 | 4.10 | 4.91 | 5.77 | 2.72 |
| Hexenes | 0.08 | 0.14 | 0.16 | 0.07 | 0.11 | 0.15 | 0.17 | 0.11 |
| Cyclohexane | 0.00 | 0.00 | 0.00 | 0.00 | 0.00 | 0.00 | 0.00 | 0.00 |
| Methycyclopentane | 0.02 | 0.04 | 0.21 | 0.00 | 0.00 | 0.00 | 0.00 | 0.00 |
| 2,4-Dimethylpentane | 0.91 | 1.12 | 1.05 | 1.34 | 1.57 | 1.76 | 1.82 | 1.11 |
| 2-Methylhexane | 9.89 | 10.47 | 10.36 | 11.42 | 12.13 | 12.04 | 11.22 | 10.52 |
| 3-Methylhexane | 13.72 | 14.04 | 13.59 | 14.82 | 15.35 | 15.05 | 13.94 | 13.76 |
| n-Heptane | 45.95 | 34.14 | 26.21 | 38.75 | 30.85 | 23.19 | 17.07 | 46.31 |
| Other Heptanes (2,2-DMP, 2,2,3-TMB, 3,3-DMP, 2,3-MDP, EtP) | 6.43 | 7.39 | 7.72 | 6.62 | 7.41 | 7.97 | 8.05 | 5.42 |
| Heptens | 0.70 | 0.73 | 0.67 | 0.83 | 0.80 | 0.69 | 0.64 | 0.92 |
| Methylcycloheptane | 0.15 | 0.15 | 0.15 | 0.23 | 0.23 | 0.22 | 0.21 | 0.17 |
| Benzene | 0.16 | 0.29 | 0.41 | 0.41 | 0.47 | 0.63 | 0.85 | 0.26 |
| Toluene | 4.64 | 6.41 | 7.71 | 8.76 | 9.82 | 11.22 | 12.67 | 7.02 |
| C8+ Hydrocarbon | 0.50 | 0.60 | 0.66 | 1.03 | 1.07 | 1.16 | 1.28 | 0.87 |
| Sum | 100.0 | 100.0 | 100.0 | 100.0 | 100.0 | 100.0 | 100.0 | 100.0 |
| Sum of C7 Hydrocarbon | 77.74 | 68.05 | 59.75 | 74.00 | 68.34 | 60.92 | 52.94 | 78.20 |
| C5+ Hydrocarbon | 89.77 | 85.22 | 81.14 | 90.24 | 86.97 | 82.79 | 78.23 | 91.39 |

TABLE 10-continued

Comparison of Performance of Pt/Re/Alumina and Pt/USY-2 Under Test B Conditions (500° C., 350-360 psig, 5:1 H₂/HC)

| | Catalyst | | | | | | | |
|---|---|---|---|---|---|---|---|---|
| | 0.3Pt/0.3Re/Alumina | | | | 0.9Pt/USY-2 | | | |
| C1-C6 Hydrocarbon | 17.12 | 24.94 | 31.88 | 16.21 | 20.78 | 26.71 | 33.11 | 13.91 |
| C7+ Hydrocarbon | 82.88 | 75.06 | 68.12 | 83.79 | 79.22 | 73.29 | 66.89 | 86.09 |
| Molar Hydrocarbon Ratio | | | | | | | | |
| C1/C6 | 1.30 | 1.36 | 1.39 | 1.26 | 1.31 | 1.37 | 1.44 | 1.30 |
| C2/C5 | 1.07 | 1.09 | 1.10 | 1.12 | 1.16 | 1.21 | 1.26 | 1.22 |
| C3/C4 | 1.02 | 1.02 | 1.02 | 1.02 | 1.03 | 1.04 | 1.05 | 1.03 |
| i-C4/n-C4 | 0.27 | 0.34 | 0.39 | 0.32 | 0.37 | 0.44 | 0.50 | 0.25 |
| C1/C3 | 0.65 | 0.72 | 0.75 | 0.77 | 0.69 | 0.65 | 0.64 | 0.69 |

Figure 2:
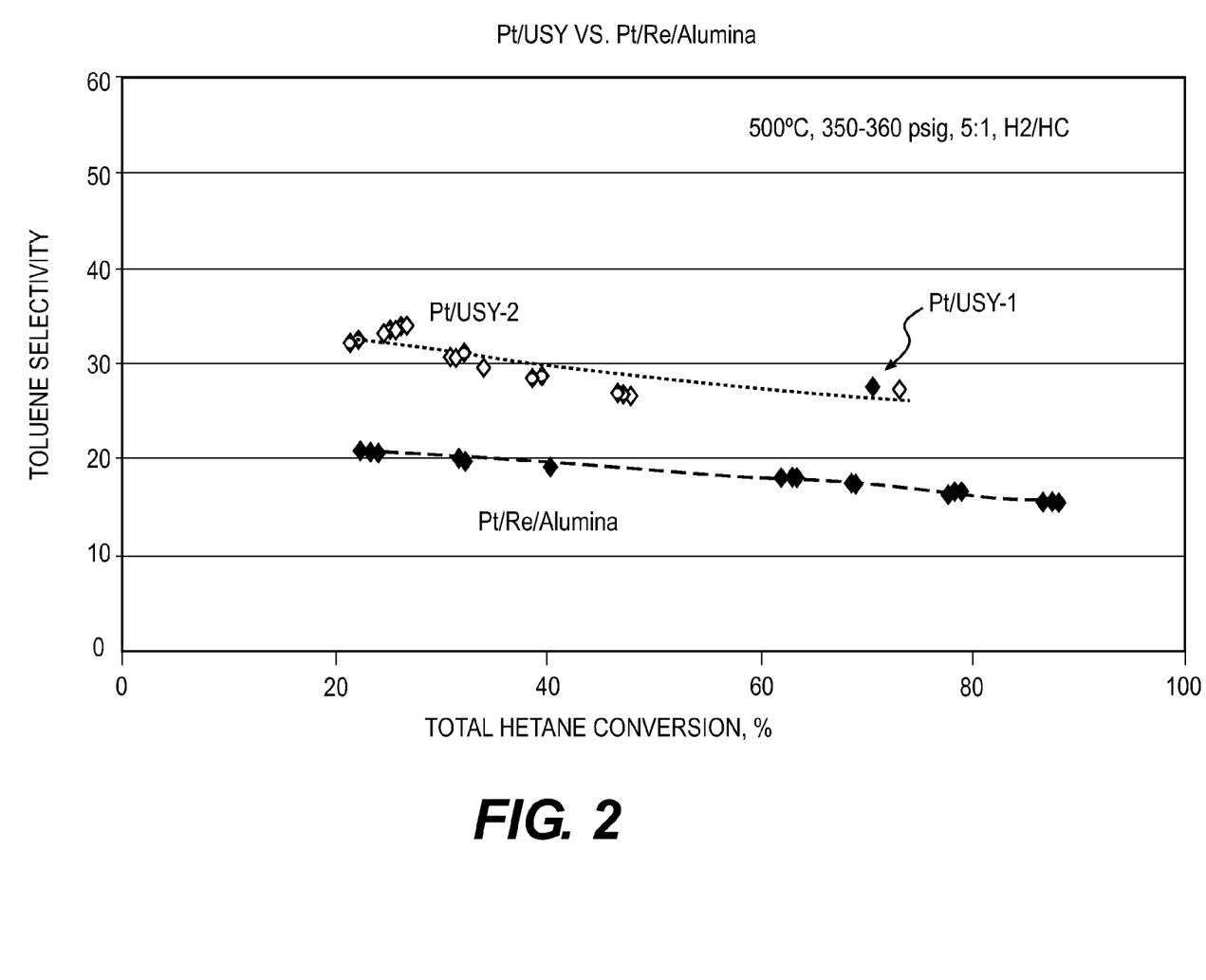
FIG. 2 is a plot of toluene selectivity vs. total heptane conversion, as described in Example 2.

FIG. 2 plots toluene selectivity vs. total heptane conversion. The data is obtained under Test A, Test B, and Test C conditions. The results again show that Pt/USY catalysts (Catalysts A and B) are more selective for toluene production than that of 0.3Pt/0.3Re/Alumina catalyst (Catalyst C).

Example 3

Catalyst Testing on Naphtha Feed

A feed with the general properties shown in Table 11, cut to 140-325° F. (IBP-FBP), was used for a secondary screening of the Pt-USY catalysts. All testing was performed at 500° C. and 350 psig, with H₂:HC ratio of 5:1 (molar). The test duration was 72 hours and the first 24 hours on stream were ignored as a line-out period. Unlike the heptane screening, the feed contained a significant quantity of naphthenes, which makes the reactions significantly endothermic. Although the intention was to run the equipment isothermally, it is noted that some undetected temperature gradients could have formed during screening.

TABLE 11

Predicted Properties of naphtha feed

| | Units | | Property | Units | |
|---|---|---|---|---|---|
| S.G. | SG6060F | 0.7403 | D86 Dist (9 Pts) | DEGF | |
| Hydrogen | WT % | 14.68 | IBP | | 163 |
| Molecular Weight | | 108.4 | 5% Off | | 193 |
| Research Octane | R + 0 | 45.5 | 10% Off | | 199 |
| Motor Octane (Clear) | M + 0 | 48.4 | 30% Off | | 228 |
| Reid Vapor Pressure | PSI | 2.1 | 50% Off | | 252 |
| Watson K Factor (Kw) | FACT | 12.002 | 70% Off | | 280 |
| Total P/O/N/A | WT % | | 90% Off | | 316 |
| Total Paraffins | | 60.3 | 95% Off | | 332 |
| Total Olefins | | 0.0 | EP | | 359 |
| Total Naphthenes | | 27.0 | | | |
| Total Aromatics | | 12.7 | | | |

Most of the materials tested with naphtha were Pt supported on USY, although some representatives from each material class were included to ensure the primary screening did not create false negatives. Prior to being placed on oil, the following procedure was used to calcine, reduce, and sulfide discovery samples:

1. Place sample in a sealed tube furnace and flow clean dry air;
2. Ramp temperature from ambient to ~120° C. at 1° C./min then hold for 2 hrs;
3. Ramp temperature from ~120° C. to 450° C. at 2° C./min (no hold);
4. Ramp temperature from 450° C. to 500° C. at 5° C./min then hold for 3 hrs;
5. Switch gas to Nitrogen and purge out air for 30 min;
6. Switch gas to Hydrogen and flow for 6 hrs;
7. Switch gas to 0.2% H₂S in Hydrogen and flow for 6 hrs;
8. Switch gas to Hydrogen and flow for 2 hrs;
9. Cool as fast as possible to ≥25° C. wall temperature;
10. Switch gas to Nitrogen and flow for 2 hrs before removing;
11. Store in Nitrogen purged low humidity box until loading into tubes for testing.

Samples were then loaded into quartz tubes for testing and transferred into the reactor. The catalysts were brought up to 500° C. in a hydrogen environment for 140 minutes prior to the introduction of hydrocarbon.

Figure 3:
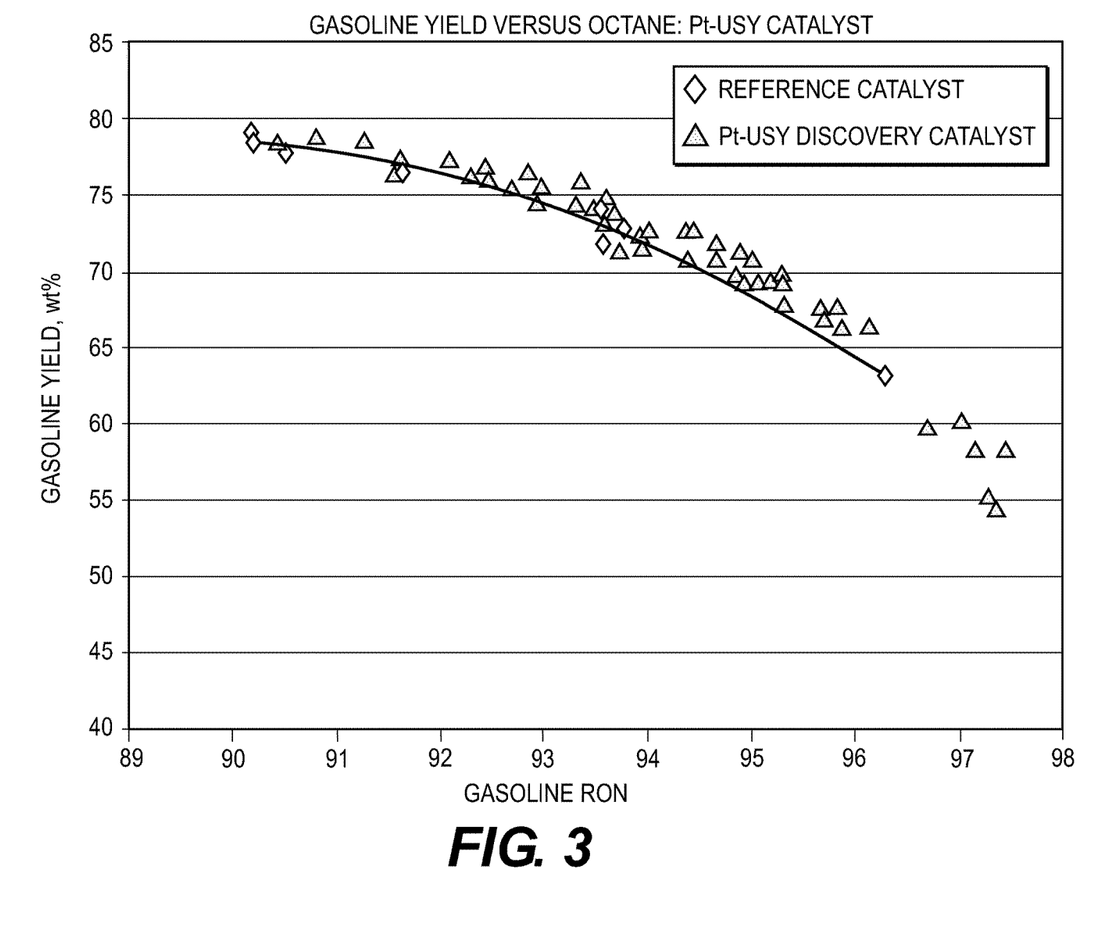
FIG. 3 is a plot of gasoline yield v. gasoline research octane numbers (RON) for catalysts of the present application, as described in Example 3.

Yield-octane curves for several Pt/USY samples are shown in FIG. 3 along with the performance of the reference catalysts. The reference catalyst was Catalyst C. One trend observed during primary screening also holds when naphtha is used as a feed: lower aluminum content, and therefore lower acidity of the USY zeolite, prior to further dealumination improves selectivity. However, in contrast to n-heptane performance, the Pt/USY catalyst's performance approaches that of the PtRe reference (it exceeded the more selective Pt-only performance on heptane feed). This indicates that at least part of the selectivity benefit is reduced when the other major reforming reactions (mostly the facile naphthene dehydrogenation) are included.

As shown, Pt-USY shows similar gasoline and hydrogen selectivities to the reference catalyst on naphtha feed. Also, Pt-USY appears more stable on naphtha with an order of magnitude lower coke formation. It is therefore possible to take advantage of the lower aging rate by operating at lower hydrogen pressures and higher temperatures to improve gasoline yield without compromising cycle length.

Example 4

Catalyst Testing on Naphtha Feed Under Accelerated Aging Conditions

A feed with properties shown in Table 11, cut to 140-325° F. was tested. Testing was performed at 150 psig, H₂:HC ratio of 1.5 (molar), with temperature adjusted to achieve a constant research octane number (RON) of 95. The starting temperature was 485° C. for the test. These extreme conditions are designed to completely deactivate the catalysts within one week. Three catalysts were tested for naphtha reforming.

1. 0.3% Pt/0.3% Re/Alumina (Catalyst C)

The same catalyst used for n-heptane test described in Example 4. This catalyst contained 0.9 wt % Cl and 0.09 wt % S. A 4 cc (2.79 g) of this catalyst was used for naphtha test. Feed flow rate for this catalyst was 1.9 LHSV. Catalyst C is KX-120, which is commercially available.

2. 0.3% Pt/Alumina (Catalyst D)

This catalyst contained 0.3 wt % Pt, 0.8 wt % Cl and 0.04 wt % S. A 5 cc (3.43 g) of this catalyst was used for naphtha test. Feed flow rate for this catalyst was 1.5 LHSV. Catalyst D is Criterion PHF-45 (0.3 wt % Pt on $Al_2O_3$).

3. 0.9% Pt/USY-1 (Catalyst A)

This is the same catalyst used for n-heptane test described in Example 3. A 4 cc (1.68 g) of this catalyst was used for naphtha test. Feed flow rate for this catalyst was 1.9 LHSV.

TABLE 12

Naphtha Predicted Feed Properties

| RON | 54.8 |
|---|---|
| MON | 54.0 |
| Total Aromatics | 12.6 |
| Naphtha Composition, wt % | |
| N-Pentane | 0.56 |
| Iso-Pentane | 0.16 |
| Total C5 = | 0.00 |
| Cyclopentane | 0.18 |
| N-Hexane | 6.83 |
| Total C6 I-Para | 4.52 |
| Total C6 = | 0.00 |
| M-Cyclopentane | 2.28 |
| Cyclohexane | 1.78 |
| Benzene | 0.76 |
| N-Heptane | 8.00 |
| Total C7 I-Para | 7.41 |
| Total C7 N5 | 3.53 |
| M-Cyclohexane | 3.90 |
| Toluene | 2.66 |
| N-Octane | 6.64 |
| Total C8 I-Para | 8.09 |
| Total C8 Naph | 7.28 |
| Total C8 Arom | 5.35 |
| N-Nonane | 4.74 |
| Total C9 I-Para | 6.94 |
| Total C9 Naph | 5.63 |
| Total C9 Arom | 3.36 |
| Total C10 Sats | 7.37 |
| Total C10 Arom | 0.41 |
| Total C11 Sats | 1.05 |
| C11+ Aromatics | 0.60 |
| Sum | 100.0 |

Naphtha Test Procedure

The catalyst (sized to 14-30 mesh) was loaded to the middle zone of an isothermal, down-flow, fixed-bed, and 3/8" outside diameter stainless steel reactor. After pressure test at 450 psig, the reactor pressure was set at 100 psig and $H_2$ flow was set at 200 cc/min. The reactor was heated at a ramp rate of 2° C./min from 20° C. to 450° C., then at 5° C./min from 450° C. to 500° C. After 30 minutes, the reactor was cooled down to 400° C. The reactor pressure was set at 150 psig. Once reaching 150 psig, the $H_2$ flow rate was reduced to 32 cc/min, and naphtha feed was introduced to the reactor at 7.6 cc/hr. The reactor was heated at a ramp rate of 5° C./min from 400° C. to 485° C. Fifteen minutes after the reactor reached 485° C., product analysis was conducted by an on-line GC (60M DB-1, −20° C., 2 min, 8° C./min to 250° C., hold for 30 min). GC analysis was conducted every 2 hour until the end of run. Product RON was calculated from GC analysis. Reaction temperature was adjusted so that the product RON was maintained at 95. The final temperature of the run was 525° C.

Comparison of Performance of Pt/Re/Alumina, Pt/Re/Alumina, and Pt/USY Catalysts

Figure 4:
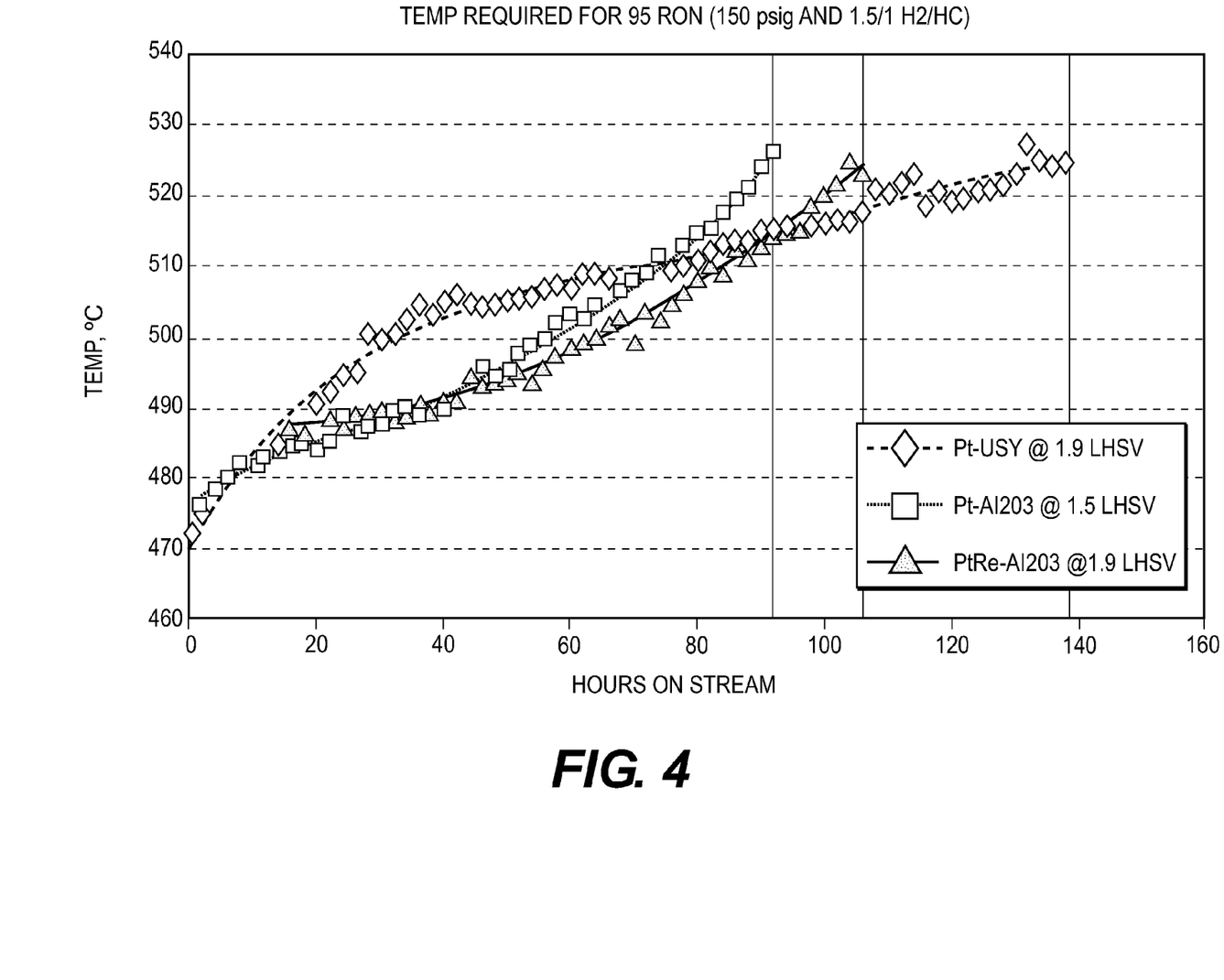
FIG. 4 is a plot of the temperature required for 95 RON vs. time on stream for catalysts of the present application, as described in Example 4.

To compare aging rate, temperature required for 95 RON vs. time on stream is plotted in FIG. 4. After initial deactivation, the Pt/USY catalyst maintained RON better than the Pt/Re/Alumina, and Pt/USY catalysts, i.e., Pt-USY aged at a lower rate than the Pt/alumina and PtRe/alumina catalysts at temperatures above 500° C.

Figure 5:
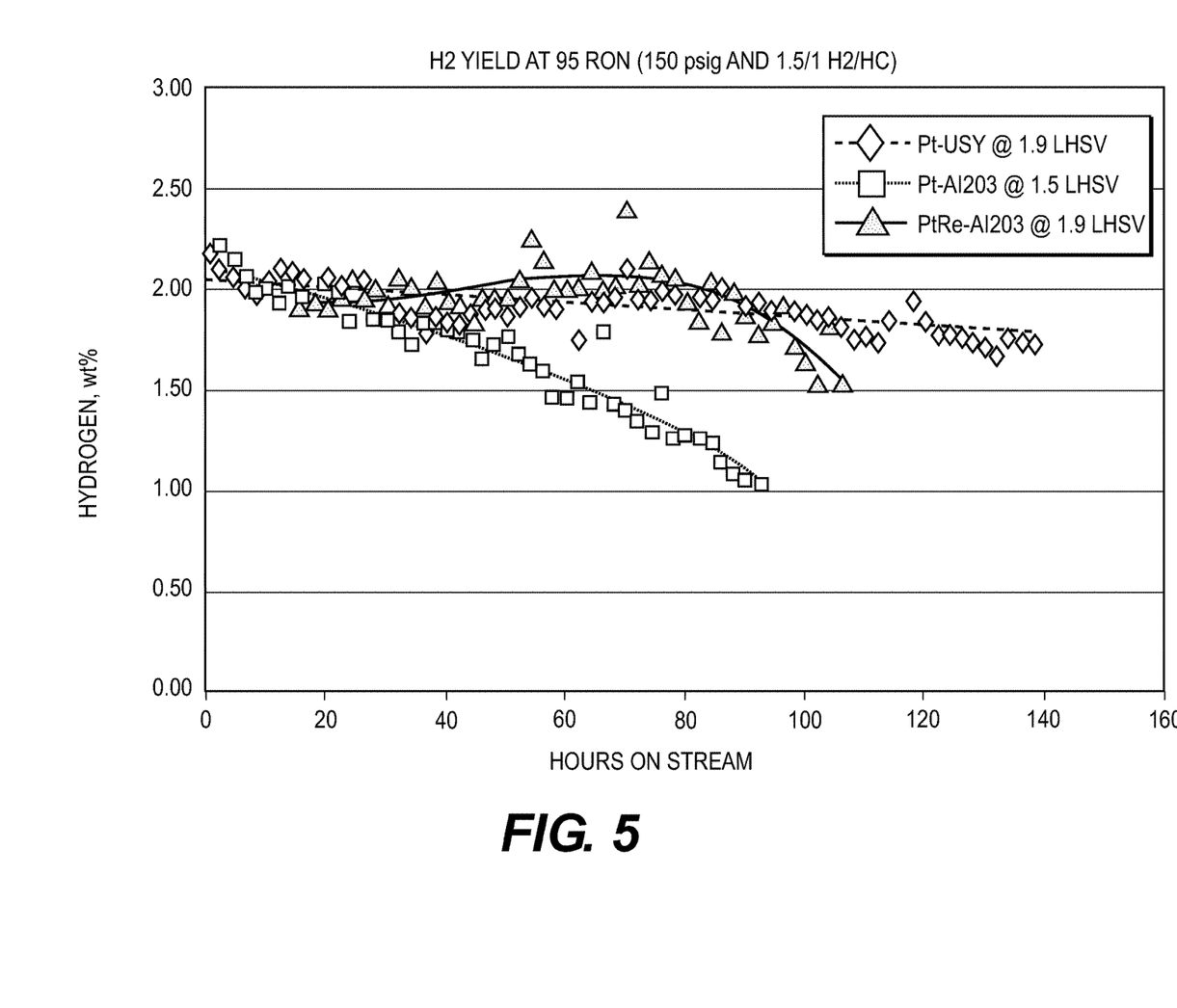
FIG. 5 is a plot of the wt % hydrogen produced at 95 RON vs. time on stream, as described in Example 5.

To compare hydrogen yield, wt % hydrogen produced at 95 RON vs. time on stream is plotted in FIG. 5. The Pt/USY catalyst maintained hydrogen yield better than the Pt/alumina and PtRe/alumina catalysts.

To further demonstrate lower aging rate of Pt/USY catalyst, the spent catalysts were analyzed for their coke content. The data is shown in Table 13 below. The Pt/USY catalyst had much slower coke formation rate than the Pt/alumina and PtRe/alumina catalysts.

TABLE 13

Coke Analysis of Spent Catalysts

| | Pt/USY | Pt/Alumina | Pt/Re/Alumina |
|---|---|---|---|
| Coke on Spent Catalyst, wt % | 1.9 | 11.6 | 11.2 |
| Days on Stream for Naphtha Run | 5.8 | 3.9 | 4.6 |
| Coke Formation Rate, wt %/Day | 0.3 | 3.0 | 2.4 |

The presently disclosed subject matter is not to be limited in scope by the specific embodiments described herein. Indeed, various modifications of the disclosed subject matter in addition to those described herein will become apparent to those skilled in the art from the foregoing description and the accompanying figures. Such modifications are intended to fall within the scope of the appended claims.

It is further to be understood that all values are approximate, and are provided for description.

Patents, patent applications, publications, product descriptions, and protocols are cited throughout this application, the disclosures of each of which is incorporated herein by reference in its entirety for all purposes.

The invention claimed is:

1. A process for the preparation of a catalyst suitable for use in a naphtha reforming process comprising:
   (a) providing a Y zeolite with an initial $SiO_2:Al_2O_3$ molar ratio of at least 150;
   (b) introducing the Y zeolite to a binder to form an intermediate composition;
   (c) extruding the intermediate composition;
   (d) reducing the acidity of the extruded composition to provide a low acid composition such that the alpha acidity of the low acid composition is less than about 1.25; and
   (e) introducing a noble metal to the low acid composition; wherein the noble metal is selected from the group consisting essentially of platinum, rhenium, iridium, or combinations thereof, wherein the noble metal is introduced to the low acid composition via impregnation in a rotating impregnation cone; and
   wherein the catalyst suitable for use in a flaptha naphtha reforming process is chlorine free.

2. The process of claim 1, wherein the initial SiO$_2$:Al$_2$O$_3$ molar ratio of the Y zeolite is at least 200.

3. The process of claim 1, wherein the Y zeolite is initially in an H-form.

4. The process of claim 1, further comprising introducing a polyvinyl alcohol to the Y zeolite prior to extruding the intermediate composition.

5. The process of claim 1, wherein the binder includes SiO$_2$.

6. The process of claim 5, wherein the intermediate composition has a solid weight ratio of Y zeolite:binder of from about 7:3 to about 9:1 prior to being extruded, based on the total solid weight of the intermediate composition at 1000° F.

7. The process of claim 1, wherein reducing the acidity of the extruded composition includes calcining the extruded composition.

8. The process of claim 7, wherein the calcining occurs at a heat up rate of between about 3° F. to about 7° F. per minute, and the extruded composition is maintained at at least about 1000° F. for at least 2 hours.

9. The process of claim 7, wherein reducing the acidity of the extruded composition further includes an ammonium exchange operation.

10. The process of claim 9, wherein the extruded composition at beginning of the ammonium exchange operation has a pH of between about 5.7 to about 5.0 and the extruded composition at the end of the ammonium exchange operation has a pH of between about 4.5 to about 3.8.

11. The process of claim 9, wherein the ammonium exchange operation includes introducing a NH$_4^+$ source to a vessel containing the extruded composition, and mixing the NH$_4^+$ source with the extruded composition.

12. The process of claim 9, wherein reducing the acidity of the extruded composition further includes a steaming operation.

13. The process of claim 12, wherein the steaming operation includes heating the extruded composition to at least 1400° F. at a rate of between about 3° F. to about 7° F. per minute and subsequently introducing steam to the heated composition.

14. The process of claim 1, wherein the low acid composition has an alpha acidity of less than 1.0.

15. The process of claim 14, wherein the low acid composition has an alpha acidity of less than 0.5.

16. The process of claim 1, further including
(f) drying the composition from (e) to prepare a dried catalyst; and
(g) calcining the dried catalyst.

* * * * *